United States Patent
Guo (10) Patent No.: US 11,513,863 B2
(45) Date of Patent: Nov. 29, 2022

(54) GAME SERVER ARCHITECTURE

(71) Applicant: Shanghai Lilith Technology Corporation, Shanghai (CN)

(72) Inventor: Xiaolin Guo, Shanghai (CN)

(73) Assignee: Shanghai Lilith Technology Corporation, Shanghai (CN)

(*) Notice: Subject to any disclaimer, the term of this patent is extended or adjusted under 35 U.S.C. 154(b) by 0 days.

(21) Appl. No.: 17/778,338

(22) PCT Filed: Nov. 17, 2020

(86) PCT No.: PCT/CN2020/129235
§ 371 (c)(1),
(2) Date: May 19, 2022

(87) PCT Pub. No.: WO2021/104101
PCT Pub. Date: Jun. 3, 2021

(65) Prior Publication Data
US 2022/0350657 A1 Nov. 3, 2022

(30) Foreign Application Priority Data
Nov. 26, 2019 (CN) .......................... 201911174020.X (51) Int. Cl.
*G06F 9/46* (2006.01)
*G06F 9/50* (2006.01)
(Continued)

(52) U.S. Cl.
CPC .......... *G06F 9/505* (2013.01); *G06F 12/0806* (2013.01); *H04L 63/083* (2013.01); *H04L 67/131* (2022.05)

(58) Field of Classification Search
CPC ..... G06F 9/505; G06F 12/0806; H04L 67/131
See application file for complete search history.

(56) References Cited

U.S. PATENT DOCUMENTS

2013/0100321 A1* 4/2013 Schmid ............. H01L 27/14621
348/281

FOREIGN PATENT DOCUMENTS

CN 101286906 A 10/2008
CN 101582850 A 11/2009
(Continued)

OTHER PUBLICATIONS

Sapp, Armistead W; Implement, improve and expand your statewide longitudinal data system : creating a culture of data in education; 2014.*

(Continued)

*Primary Examiner* — Camquy Truong
(74) *Attorney, Agent, or Firm* — David R. Stevens; Stevens Law Group (57) ABSTRACT

The present disclosure provides a game server architecture. A gateway server can pull operation data of game servers and write the operation data into a load balancing cluster to balance load of the game servers, avoiding the crash of the game servers due to excessive load of a certain game server. A database cluster uses data identification segments to balance an amount of data by weight. When the amount of data generated by the game servers or a logic server group is too large, the database cluster can be dynamically expanded to meet storage requirements of the larger amount of data. In addition, when data in the database cluster and a consistent-hash-based cache server is accessed, the data is preferentially accessed from the consistent-hash-based cache server, to avoid a problem that each data access is done through the database, which causes a huge pressure on database IO.

10 Claims, 4 Drawing Sheets

(51) Int. Cl.
*H04L 67/131* (2022.01)
*G06F 12/0806* (2016.01)
*H04L 9/40* (2022.01)

(56) References Cited

FOREIGN PATENT DOCUMENTS

| CN | 102104600 A | 6/2011 |
| CN | 103023863 A | 4/2013 |
| CN | 103944993 A | 7/2014 |
| CN | 104065568 A | 9/2014 |
| CN | 105045789 A | 11/2015 |
| CN | 105812465 A | 7/2016 |
| CN | 105872098 A | 8/2016 |
| CN | 206775541 U | 12/2017 |
| CN | 109513206 A | 3/2019 |
| CN | 109831523 A | 5/2019 |
| CN | 109995881 A | 7/2019 |
| CN | 110209500 A | 9/2019 |
| CN | 110855708 A | 2/2020 |

OTHER PUBLICATIONS

Liu, A Game Approach to Multi-Servers Load Balancing with Load-Dependent Server Availability Consideration, IEEE Transactions on Cloud Computing, vol. 9, No. 1, Jan.-Mar. 2021, Apr. 6, 2022.

Dongxu Li, Research on High-Performance System Architecture and Concurrency Technology of Large-Scale Online, Mar. 2015.

\* cited by examiner

GAME SERVER ARCHITECTURE

TECHNICAL FIELD

The present disclosure relates to a field of game, and in particular to, a game server architecture.

BACKGROUND

A distributed cluster usually includes a plurality of node devices in communication connection. A distributed cluster architecture is used for a current game servers. Most games on the market are using the strategy of opening different services in different areas. Game players from different areas are physically isolated from each other. If there is a cross-regional gameplay, data of the players needs to be copied in real time, and a large network delay exists. In addition, multiple players can correspondingly log into respective game servers, and a large amount of data is also correspondingly generated. The amount of data generated by the players is generally stored in a database in the manner of accessing the database. When the number of players is relatively large, the players are frequently online and offline, and the amount of data of the players is too large, the limited capacity of the database cannot support the amount of data of the players, causing the all processes to slow down. At the same time, each data access is done through the database, which causes a huge pressure on database IO, and the speed of data access through the database is relatively slow.

SUMMARY

An object of the present disclosure is to solve a problem in the prior art that each data access from players is done through the database, which causes a huge pressure on database IO. Therefore, the present disclosure provides a game server architecture to avoid huge pressure on the database IO.

To solve the problem, an implementation of the present disclosure discloses a game server architecture, comprising: game servers, a database cluster, a consistent-hash-based cache server, a load balancing cluster, a logic server group, a center server, and a gateway server;

the gateway server is respectively connected to the load balancing cluster and the center server, to recommend a target game server and service data corresponding to the target game server to a target user according to a predefined rule when the target user accesses the game servers for the first time, and enable the target user to access to the target game server by using the center server, and the gateway server pulls operation data of the game servers and writes the operation data to the load balancing cluster to balance the load of the game servers;

the logic server group is respectively connected to the game servers, the database cluster, the consistent-hash-based cache server, and the center server, and is used to control a process of the target user, and data generated by the logic server group is updated to the database cluster in real time, wherein the database cluster uses data identification segments to balance an amount of data by weight to dynamically expand a database as the amount of data increases;

the center server is further used to monitor the game servers, the database cluster, the consistent-hash-based cache server, the load balancing cluster and the logic server group; and the game servers are connected to the consistent-hash-based cache server, and data generated by the game servers and the logic server group is synchronously updated to the consistent-hash-based cache server;

wherein, when the data stored in the database cluster and the consistent-hash-based cache server is accessed, the data is preferentially accessed from the consistent-hash-based cache server.

Alternatively, the logic server group controlling a process of the target user includes:

a target process of the target user issues a login request,
determining whether there is another process in a waiting queue; and if there is the another process, sending a kick-out signal to the process using a login lock, and after the process using the login lock releases the login lock, assigning the login lock to the target process.

Alternatively, the gateway server pulling operation data of the game servers and writing the operation data to the load balancing cluster to balance the load of the game servers comprises:

pulling current CPU load data and current memory load data of each game server by using a script;

writing the current CPU load data and the current memory load data into the load balancing cluster by using the gateway server; and based on the load balancing cluster, assigning the memory load data to different game servers according to load weights, to balance the memory load data.

Alternatively, the game server, the database cluster, the consistent-hash-based cache server, the load balancing cluster and the logic server group each have a standby server, and that the center server monitoring the game servers, the database cluster, the consistent-hash-based cache server, the load balancing cluster and the logic server group comprises:

respectively monitoring, by a monitoring process, whether the game servers, the database cluster, the consistent-hash-based cache server, the load balancing cluster and the logic server group are alive or not; and if there is a non-alive server in the game servers, the database cluster, the consistent-hash-based cache server, the load balancing cluster and the logic server group, switching the non-alive server to a corresponding standby server.

Alternatively, the logic server group comprises: a logic service process group, logic physical servers and a logic management server;

the logic service process group is formed in the logic management server, and the logic management server is used to monitor the logic physical servers, and if there is an abnormal logic physical server, the abnormal logic physical server is dynamically switched to another idle logic physical server; and the logic management server is further used to update dynamic routing information of all logic physical servers in real time.

Alternatively, the game server architecture further includes: an online player routing server used to monitor the game servers where each target user is located; and the online player routing server is respectively connected to the center server and the game servers, and when the target user is online, the center server controls the online player routing server to modify knapsack data; and when the target user is offline, the center server is switched to the logic server group to modify the knapsack data.

Alternatively, the game server architecture further includes: a notification information push server; and the notification information push server is respectively connected to the game servers and the logic server, and is used to push a target message corresponding to the game servers and the logic server for the target user.

Alternatively, the logic server group is connected to the consistent-hash-based cache server and the database cluster, and the center server controls a public process to modify public data in the logic server group.

Alternatively, a data storage structure in the consistent-hash-based cache server is a key-value pair data structure.

Alternatively, the database cluster is specifically a MySQL database.

The implementations of the present disclosure disclose a game server architecture, and have the following beneficial effects:

A gateway server is connected to a load balancing cluster and a center server. When a target user accesses to a game server for the first time, the gateway server can recommend to the target user a target game server and service data corresponding to the target game server according to a predefined rule, and enable the target user to access to the target game server by the center server. After the target user accesses to the target game server, the gateway server pulls operation data of the game server and writes the operation data into the load balancing cluster to balance load of the game servers, avoiding the crash of the game servers due to excessive load of a certain game server. The database cluster uses data identification segmentation to balance the amount of data by weight. When the amount of data generated by the game server or logical server group is too large, the database cluster can be dynamically expanded to meet the storage requirements of larger amount of data. In addition, when data in the database cluster and a consistent-hash-based cache server is accessed, the data is preferentially accessed from the consistent-hash-based cache server, avoiding the problem that each data access is done through the database, which causes a huge pressure on database 10. In addition, because the amount of player data generated is synchronously stored in the consistent-hash-based cache server, the data is accessed from the consistent-hash-based cache server, so that the data is accessed at high speed and the network latency is relatively short.

Other features of the present disclosure and corresponding benefits are set forth in later parts of the specification, and it should be understood that at least some of the benefits become apparent from the description of the present specification.

DETAILED DESCRIPTION

The implementations of the present disclosure are described below by specific embodiments, and a person skilled in the art can easily understand other advantages and effects of the present disclosure from the contents disclosed in this description. Although the description of the invention is presented with reference to the preferred embodiment, this does not mean that the features of the invention are limited to this embodiment. On the contrary, an objective of introducing the invention with reference to the implementations is to cover other options or modifications that may be extended based on the claims of the present disclosure. The following description contains numerous specific details in order to provide a thorough understanding of the present disclosure. The present disclosure may also be implemented without these details. In addition, some specific details are omitted from the description in order to avoid obscuring or obscuring the gist of the present disclosure. It should be noted that the embodiments of the present disclosure and the features of the embodiments may be combined with each other under the condition of no conflict.

It should be noted that in this description, similar numerals and letters refer to similar items in the following drawings. Therefore, once an item is defined in one figure, there is no need to define the item in subsequent drawings for further definitions and explanations.

The technical solutions of the present disclosure are clearly and completely described below with reference to the accompanying drawings. Obviously, the described embodiments are part of the embodiments of the present disclosure, but not all of the embodiments. Based on the embodiments of the present disclosure, all other embodiments obtained by a person of ordinary skill in the art without creative efforts shall fall within the protection scope of the present disclosure.

In the description of the present disclosure, it should be noted that the orientation or positional relationship indicated by the terms "central", "upper", "lower", "left", "right", "vertical", "horizontal", "inner", "outer", etc. are based on the orientation or positional relationship shown in the drawings, and are only for the convenience of describing the present disclosure and simplifying the description, and do not indicate or imply that the pointed device or element must have a specific orientation, or be constructed and operated in a specific orientation, and therefore cannot be understood as a limitation of the present disclosure. Furthermore, the terms "first", "second", and "third" are used for descriptive purposes only and should not be construed to indicate or imply relative importance.

In the description of the present disclosure, unless otherwise specified and limited, it should be noted that the terms "installed", "attached", and "connected" should be understood in a broad sense. For example, the connection may be a fixed connection or a detachable connection, or an integral connection; or may be a mechanical connection or an electrical connection; or may be a direct connection or an indirect connection through an intermediate medium, or may be internal communication between two elements. For the person of ordinary skill in the art, the specific meaning of the above terms can be understood according to specific conditions.

In order to make the objectives, technical solutions and advantages of the present disclosure clearer, the embodiments of the present disclosure are further described in detail below with reference to the accompanying drawings.

A distributed cluster usually includes a plurality of node devices in communication connection. A distributed cluster architecture is used for current game servers.

Most games on the market are using the strategy of opening different services in different areas. Game players from different areas are physically isolated from each other. If there is a cross-regional gameplay, data of the players needs to be copied in real time, and a large network delay exists, and stability is poor. In addition, multiple players can correspondingly log into the game servers, and a large amount of data is also correspondingly generated. The amount of data generated by the players is generally stored in a database in the form of accessing the database. When the number of players is relatively large, the players frequently go online and go offline, and the amount of player data is too large, the limited capacity of the database cannot support the amount of player data, and consequently all the processes are caused to slow down. At the same time, each data access is done through the database, which causes a huge pressure on database IO.

Figure 1:
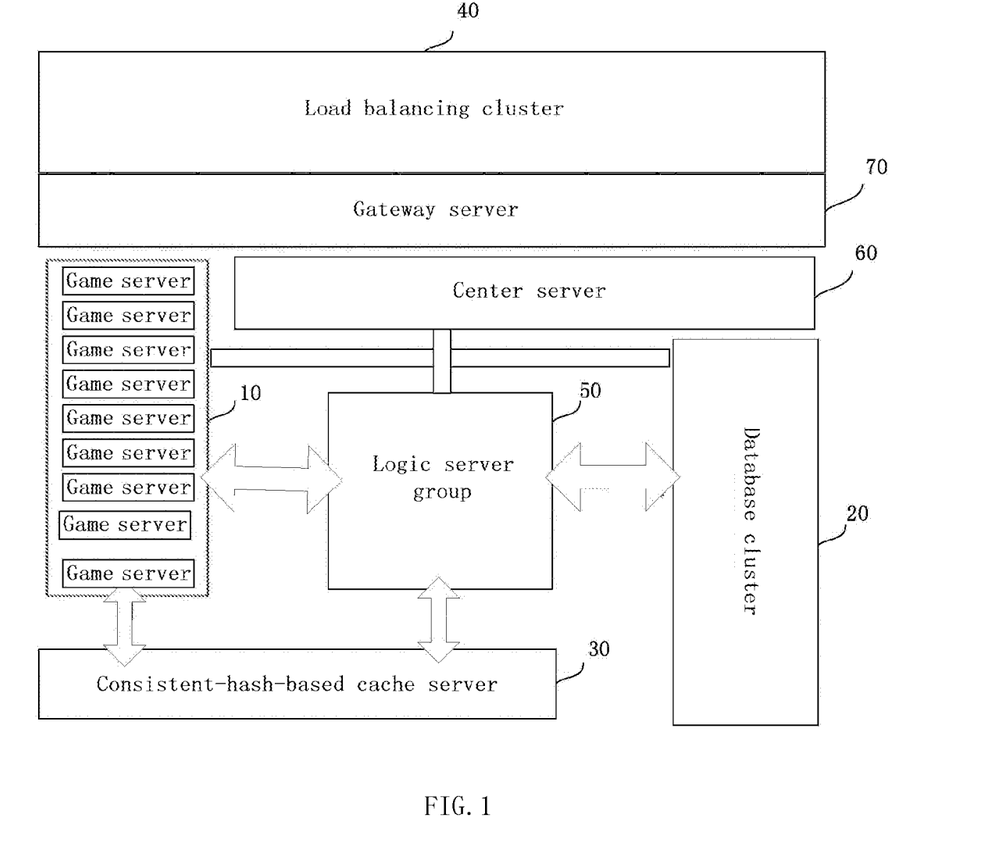
FIG. 1 is a schematic structural diagram of a game server architecture disclosed in an embodiment of the present disclosure.
Figure 2:
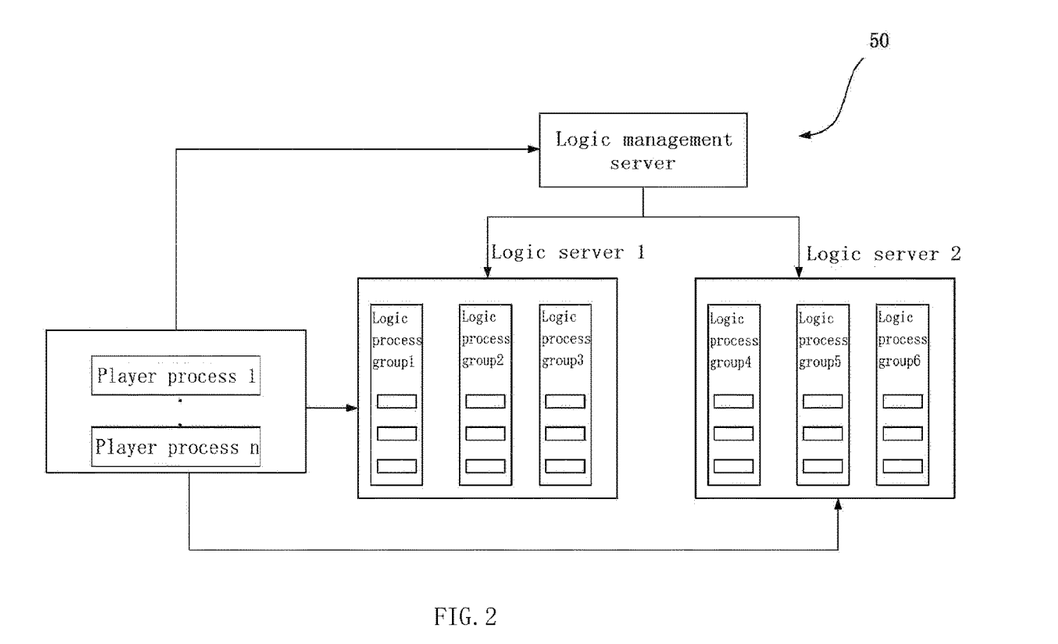
FIG. 2 is a schematic diagram of a correspondence between a logic server group and game servers disclosed in an embodiment of the present disclosure.
Figure 3:
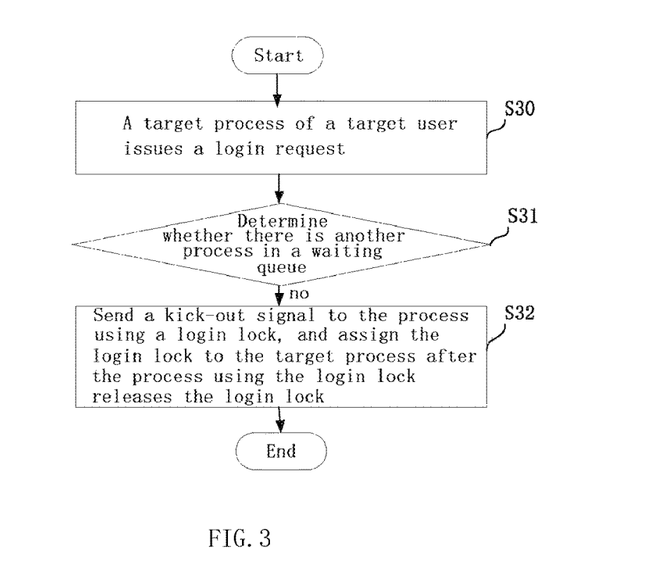
FIG. 3 is a schematic flowchart of a method for controlling a target user by a logic server group disclosed in an embodiment of the present disclosure.
Figure 4:
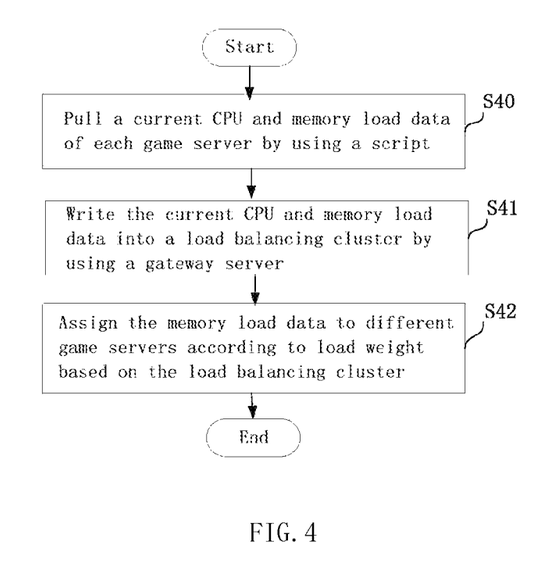
FIG. 4 is a schematic flowchart of a method for balancing load of game servers by a gateway server disclosed in an embodiment of the present disclosure.
Figure 5:
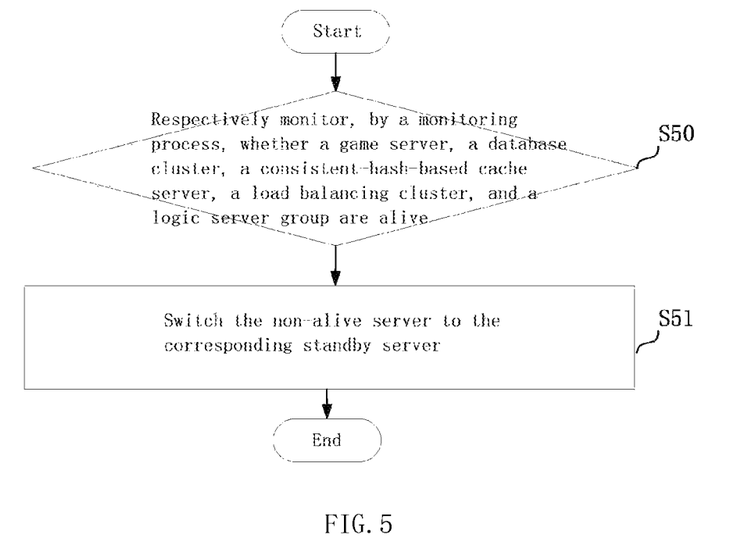
FIG. 5 is a schematic flowchart of a method for monitoring each server by a center server disclosed in an embodiment of the present disclosure.

A game server architecture disclosed by an embodiment of the present disclosure is described below with reference to FIGS. 1, 2, 3, 4, and 5. FIG. 1 is a schematic structural diagram of a game server architecture disclosed by an embodiment of the present disclosure. FIG. 2 is a schematic diagram of a correspondence between a logic server group and a game server disclosed in an embodiment of the present disclosure. FIG. 3 is a schematic flowchart of a method for controlling a target user by a logic server group disclosed in an embodiment of the present disclosure. FIG. 4 is a schematic flowchart of a method for balancing load of a game server by a gateway server disclosed in an embodiment of the present disclosure. FIG. 5 is a schematic flowchart of a method for monitoring each server by a center server disclosed in an embodiment of the present disclosure.

As shown in FIG. 1, the game server architecture includes: game servers 10, a database cluster 20, a consistent-hash-based cache server 30, a load balancing cluster 40, a logic server group 50, a center server 60, and a gateway server 70.

The gateway server 70 is respectively connected to the load balancing cluster 40 and the center server 60, to recommend a target game server and service data corresponding to the target game server for a target user according to a predefined rule when the target user accesses to the game servers 10 for the first time, and enable the target user to access to the target game server by using the center server 60. The gateway server 70 pulls operation data of the game servers 10 and writes the operation data to the load balancing cluster 40 to balance loads of the game servers 10.

The logic server group 50 is respectively connected to the game servers 10, the database cluster 20, the consistent-hash-based cache server 30, and the center server 60 to control a process of the target user, and data generated by the logic server group 50 is updated to the database cluster 20 in real time. The database cluster 20 uses data identification segments to balance the amount of data by weight to dynamically expand the database as the amount of data increases.

The center server 60 is further used to monitor the game servers 10, the database cluster 20, the consistent-hash-based cache server 30, the load balancing cluster 40, and the logic server group 50.

The game servers 10 are connected to the consistent-hash-based cache server 30, and the data generated by the game servers 10 and the logic server group 50 is synchronously updated to the consistent-hash-based cache server 30.

When the data stored in the database cluster 20 and the consistent-hash-based cache server 30 is accessed, the data is preferentially accessed from the consistent-hash-based cache server 30.

In some embodiments of the present disclosure, the game server 10 is a node where the player actually logs in, and the consistent-hash-based cache server 30 can store any type of in-game data. A data structure is a Key/Value structure (key-value pair data structure). Value can be a structure or binary. The consistent-hash-based cache server 30 uses consistent hash for uniform distribution, and when a node of the cache server is added or deleted, it will only affect a small amount of data to be migrated.

The database cluster 20 could alternatively be 5 Mysql physical servers, to support 30 million+ players. For the database cluster 20, the database cluster 20 using data identification segments to balance the amount of data by weight means that users accessing to the database cluster 20 are uniform distributed. For example, 10 Mysql physical servers are connected to the database cluster 20, the number of imported players is 1 million, and the 1 million players are uniform distributed by weight 1 on the 10 Mysql physical servers. As the number of players increases, the database cluster 20 is dynamically expanded to 20 Mysql physical servers as the amount of data increases, and the number of players increases to 2 million, so as to avoid a problem that players are unable to log in when the database cluster cannot be expanded to carry player data in the prior art. For the original 1 to 1 million players, the data thereof is still distributed in the original 10 Mysql physical servers, and relative routing information and data do not change. 1 million to 2 million players have a ⅓ probability of distributing in the original 10 Mysql physical servers, and have a ⅔ probability of distributing in the 10 Mysql physical servers added later. The weights that players are assigned to the different Mysql physical servers can be customized, and it is not limited in this embodiment of the present disclosure. In addition, the data structure in the database cluster 20 may also be a Key/Value structure, and Value may be a structure or binary.

In some embodiments of the present disclosure, as shown in FIG. 2, the game servers 10 correspond to the player servers, which correspond to the player process. The logic server group 50 corresponds to the logic physical server, the logic process group and the logic management server. FIG. 2 represents a correspondence among the player processes, the logic process group, the logic server group, and the logic management server. The player process is mainly responsible for processing the player's business logic, such as building upgrades and military training in the game "Art of Conquest". The logic process group is mainly responsible for the logical processes within the logical server group that need to be publicly locked, such as the public data modified when players entering and leaving the game server 10, the plundering of public resources on the game map, and battles, etc. The logic management server is responsible for scheduling the logic process group of a certain logic server group 50 on a certain physical logic server group. Player's game servers 10 use a stateless parallel distribution strategy. The player can log in to any game server 10 each time the player logs in. The business logic related to the player's personal data can be completed in the game server 10. After the player is offline, the player logs out by using a lightweight Erlang process. The software in the game server 10 is developed by using Erlang platform. Compared with the operating system, the Erlang process has an advantage of being lightweight.

In some embodiments of the present disclosure, when the player logs in to the game for the first time, the gateway server 70 infers the country where the player is located according to an IP of the player, and recommend to the player the game camp where the player is located in the same or similar area according to the country and the language category used by the player client, so as to facilitate communication and common development of players subsequently. Inferring a country where the player is located according to an IP of the player specifically means that the country where the player is located is directly found through the global IP positioning of the open-source IP address database.

In some embodiments of the present disclosure, the logic server group 50 where the player is located uses a distributed parallel cluster. In some embodiments of the present disclosure, the logic server group includes: a logic service process group, logic physical servers, and a logic management server. The logic service process group is formed on the logic management server. The logic management server is used to monitor the logic physical servers, and dynamically switch an abnormal logic physical server to another idle logic physical server when a logic physical server is abnormal. The logic management server is further used to update dynamic routing information of all logic physical servers in real time. The logic process group of each logic server group 50 is arranged at a logic physical server. The logic service process group includes a control process for players entering and exiting the game server 10, a vision broadcasting process, a player city defense data management process, and a ranking process. Each logic service process group is monitored by the center server 60 or the logic management server. The center server 60 is responsible for restarting the logic server when the logic server corresponding to the logic service process group fails. A logic physical server may correspond to a plurality of logic service process groups. A logic physical server can accommodate a plurality of logic service process groups. When a new server is opened, if the hardware resources are idle, a new server on the same logic server group can be opened without adding hardware configuration, which avoids increasing hardware costs. An 8-core, 16G logic physical server can accommodate more than a dozen logic service process groups. In addition, the public data in the logic server group 50 is modified by the public process, and each player queues up to request, which ensures the consistency of the data.

If the logic server group 50 is abnormal, the logic management server can monitor the abnormality in real time, and switch to another logic server group 50. Dynamic routing information of another logic server group can be updated in real time by the logic management server, and new request information will be routed to the new switched logic server group 50, The switching time is short, and it is only within a few hundred milliseconds that the player cannot receive a response. After the switching is successful, the player receives a response immediately, so that the player can normally use the new logic server group 50. For some centrally scheduled single-point services, such as logic management servers and guild war servers, globally unique data is modified by using a single process. In order to facilitate other nodes to quickly read the latest data, the embodiment of the present disclosure uses two methods of pushing and pulling to update data, the pushing method means to push, after global core data is modified, the global core data to each node (corresponding to each server) immediately. The pulling method means that when each node uses data, if there is inconsistency in the version number or digest ciphertext of the data, each node actively pulls the latest data. Generally, the data within 100 bytes is verified by the digest ciphertext, and the data exceeding 100 bytes is verified by the version number of the data. In this way, CPU consumption of the two-way calculation of the digest ciphertext is reduced.

In some embodiments of the present disclosure, the logic server group 50 is connected to the consistent-hash-based cache server 30 and the database cluster 20. The center server 60 controls the public process to modify the public data in the logic server group 50.

In some embodiments of the present disclosure, except that the gateway server 70 is connected to the load balancing cluster, the remaining servers are centrally deployed in a local area network (such as the Alibaba Cloud computer room in the east of the United States). When players in mainland China and some remote areas log in, they are connected unperceptively through a dedicated line, so as to achieve the purpose of stable low-latency data transmission.

In some embodiments of the present disclosure, the data generated by the player during the game is not only stored in a local cache and the database cluster 20, but also updated in real time to the consistent-hash-based cache server 30. In this way, the data can be read from the consistent-hash-based cache server 30, avoiding the need to go through the database cluster 20 every time the data is read, thereby reducing the pressure on the database cluster 20. In addition, the data of the player can only be modified by the player process of the certain player to maintain the consistency in the data. When there is data interaction between the player and other players, interaction is performed by using an asynchronous inter-process message. During the player is offline, the player process is directly stored in the database cluster. After the player is online, the player process is executed in the order of the storage time of the player process.

In some embodiments of the present disclosure, a battle game server performs dynamic scheduling in the form of a lobby and rooms. Each battle game opens a dynamic room process, and then the players are connected to the specific battle game server by using User Datagram Protocol (UDP), and perform the battle in the way of server frame synchronization.

In some embodiments of the present disclosure, an embodiment of the present disclosure discloses a performance profiling tool that monitors the bottlenecks of a game server by parameters, such as the number of calls for any function at a predetermined time (every 5 minutes), the call time, and the total number of calls, the total call time, and the average call time after the opening of the service, and then performs targeted optimization.

In some embodiments of the present disclosure, the game server architecture further includes: an online player routing server for monitoring the game server where each target user is located.

The online player routing server is respectively connected to the center server and the game servers. When the target user is online, the center server controls the online player routing server to modify knapsack data. When the target user is offline, the center server is switched to the logic server group to modify the knapsack data.

Specifically, message routing in the game is obtained by the online player routing server, and the specific routing information of the players can be requested in batches or individually.

In some embodiments of the present disclosure, the game server architecture further includes: a notification information push server.

The notification information push server is respectively connected to the game server and the logic server, and is used to push target messages corresponding to the game server and the logic server for the target user.

In some embodiments of the present disclosure, the game server architecture further includes: a mailbox server.

The mailbox server is respectively connected to the consistent-hash-based cache server and the database cluster.

When an email corresponding to the target user is received, only first information is updated in the consistent-hash-based cache server memory, and the first information includes a brief information list.

When the target user opens the email, second information is updated in the database cluster, and the second information is detailed information in the email, and the email is marked as read.

Specifically, the email of the player is updated and maintained by using brief information (information in the memory, corresponding to the first information) and detailed information (information in the database cluster, corresponding to the second information). When the player receives a new email, only the brief information in the memory is updated. The detailed information in the database cluster is updated only when the player opens the mailbox to actually read the content of the email. Only one email template is saved for the global email by default, and the email is sent to the mailbox of the player only after the player logs in, so that redundancy of player data is reduced. At the same time, a global mailbox domain name is updated, specifically by using optimistic lock to compare the version number of the mailbox to update it, which greatly improves concurrency while maintaining consistency.

In some embodiments of the present disclosure, when the player logs in by using a global login state lock, players need to obtain a login lock before logging in each time, avoiding inconsistent modification of data of the same player by multiple processes. When the login lock is used by more processes, there is a need to wait in line. In order to give each process a chance to log in, a kick-out signal may be sent to a previous process. After the previous process releases the login lock, the new process can obtain the login lock. If multiple processes compete for a login lock at the same time, only one waiting process is allowed in the queue and the other processes simply refused, avoiding login blocking caused by large number of processes kicking each other. Processes can include player processes and logic processes. As shown in FIG. 3, the logic server group 50 controlling the target user includes the following steps:

S30: A target process of a target user issues a login request.

S31: Determine whether there is another process in a waiting queue and if there is no another process, it proceeds to S32.

S32: Send a kick-out signal to the process using a login lock, and assign the login lock to the target process after the process using the login lock releases the login lock.

In some embodiments of the present disclosure, as shown in FIG. 4, a script can periodically obtain data, such as a current CPU, memory, and load of each game server 10, and then periodically write the data into a load balancing cluster (such as Amazon S3 servers). The gateway server 70 continuously pulls the latest load files of the game servers 10 by using a timer, and then recommends the player data to different game servers according to the load weights, so as to implement the load balancing of the game servers.

The gateway server 70 pulls operation data (the current CPU, memory and load) of the game servers 10 and writes the operation data to the load balancing cluster to balance the loads of the game servers 10, which includes the following steps:

S40: Pull current CPU load data and current memory load data of each game server by using a script.

S41: Write the current CPU load data and current memory load data into a load balancing cluster by using a gateway server.

S42: Assign the memory load data to different game servers according to load weights based on the load balancing cluster, to balance the memory load.

In some embodiments of the present disclosure, the gateway server 70 is mainly deployed in four major regions (Shanghai, Frankfurt, Singapore and Virginia), and is mainly responsible for functions such as recommending a game server and downloading a game version number, a patch package, and Language packafter a player device is accessed to game server for the first time.

In some embodiments of the present disclosure, as shown in FIG. 5, the center server 60 is a center server for all servers, and is responsible for functions such as registration of all servers (nodes), periodic state update, and switching between an active node and a standby node. Each node reports a state of itself by using a timer, including data such as a CPU, a memory, and load. Each server is provided with a standby server. After each server is successfully registered, the central server 60 starts a monitoring process to monitor whether each server node is alive. In this way, double guarantees can be used to ensure that when the server node fails, the active/standby switchover can be performed to ensure that each function can continue to execute normally. In addition, when the server node fails, a short message alarm can be performed.

The game server 10, the database cluster 20, the consistent-hash-based cache server 30, the load balancing cluster 40, and the logic server group 50 all have standby servers, and the center server 60 monitoring the game server 10, the database cluster 20 and the consistent-hash-based cache server 30, the load balancing cluster 40, and the logic server group 50 includes the following steps:

S50: Respectively monitor, by a monitoring process, whether a game server, a database cluster, a consistent-hash-based cache server, a load balancing cluster, and a logic server group are alive; if there is non-alive server in the game servers, the database cluster, the consistent-hash-based cache server, the load balancing cluster, and the logic server group, it proceeds to S51.

S51: Switch the non-alive server to the corresponding standby server.

The embodiment of the present disclosure discloses a game server architecture. A gateway server is connected to a load balancing cluster and a center server. When a target user accesses to the game server for the first time, the gateway server can recommend to the target user a target game server and service data corresponding to the target game server according to a predefined rule, and enable the target user to access to the target game server by the center server. After the target user accesses to the target game server, the gateway server pulls operation data of the game server and writes the operation data into the load balancing cluster to balance load of the game server, avoiding the crash of the game servers caused by excessive load of a certain game server. The database cluster uses data identification segmentation to balance the amount of data by weight. When the amount of data generated by the game server or logical server group is too large, the database cluster can be dynamically expanded to meet the storage requirements of larger amount of data. In addition, when data in the database cluster and a consistent-hash-based cache server is accessed, the data is preferentially accessed from the consistent-hash-based cache server, avoiding the problem in prior art that each data access is done through the database, which causes a huge pressure on database IO. In addition, because the amount of player data generated is synchronously stored in the consistent-hash-based cache server, the data is accessed from the consistent-hash-based cache server, so that the data is accessed at high speed and the network latency is relatively short.

Finally, it should be noted that the above embodiments are only used to illustrate the technical solution of the present disclosure, but not to limit the technical solution of the present disclosure. Although the present disclosure has been described in detail with reference to the foregoing embodiments, the person of ordinary skill in the art should understand that: The technical solution described in the foregoing embodiments can still be modified, or some or all of the technical features thereof can be equivalently replaced. These modifications or replacements do not make the essence of the corresponding technical solutions deviate from the scope of the technical solution of the embodiments of the present disclosure.

What is claimed is:

1. A game server architecture, comprising: game servers, a database cluster, a consistent-hash-based cache server, a load balancing cluster, a logic server group, a center server, and a gateway server;
    the gateway server is respectively connected to the load balancing cluster and the center server, to recommend a target game server and service data corresponding to the target game server to a target user according to a predefined rule when the target user accesses to the game servers for the first time, and enable the target user to access to the target game server by using the center server, and the gateway server pulls operation data of the game servers and writes the operation data to the load balancing cluster to balance the load of the game servers;
    the logic server group is respectively connected to the game servers, the database cluster, the consistent-hash-based cache server, and the center server, and is used to control a process of the target user, and data generated by the logic server group is updated to the database cluster in real time, wherein the database cluster uses data identification segments to balance an amount of data by weight to dynamically expand a database as the amount of data increases;
    the center server is further used to monitor the game servers, the database cluster, the consistent-hash-based cache server, the load balancing cluster and the logic server group; and
    the game servers are connected to the consistent-hash-based cache server, and data generated by the game servers and the logic server group is synchronously updated to the consistent-hash-based cache server;
    wherein, when the data stored in the database cluster and the consistent-hash-based cache server is accessed, the data is preferentially accessed from the consistent-hash-based cache server.

2. The game server architecture according to claim 1, wherein the logic server group controlling a process of the target user comprises:
    a target process of the target user issues a login request, determining whether there is another process in a waiting queue; and
    if there is the another process, sending a kick-out signal to the process using a login lock, and after the process using the login lock releases the login lock, assigning the login lock to the target process.

3. The game server architecture according to claim 1, wherein the gateway server pulling operation data of the game servers and writing the operation data to the load balancing cluster to balance the load of the game servers comprises:
    pulling current CPU load data and current memory load data of each game server by using a script;
    writing the current CPU load data and the current memory load data into the load balancing cluster by using the gateway server; and
    based on the load balancing cluster, assigning the memory load data to different game servers according to load weights, to balance the memory load data.

4. The game server architecture according to claim 1, wherein the game server, the database cluster, the consistent-hash-based cache server, the load balancing cluster and the logic server group each have a standby server, and the center server monitoring the game servers, the database cluster, the consistent-hash-based cache server, the load balancing cluster and the logic server group comprises:
    respectively monitoring, by a monitoring process, whether the game servers, the database cluster, the consistent-hash-based cache server, the load balancing cluster and the logic server group are alive or not; and
    if there is a non-alive server in the game servers, the database cluster, the consistent-hash-based cache server, the load balancing cluster and the logic server group, switching the non-alive server to a corresponding standby server.

5. The game server architecture according to claim 1, wherein the logic server group comprises: a logic service process group, logic physical servers and a logic management server;
    the logic service process group is formed in the logic management server, and the logic management server is used to monitor the logic physical servers, and if there is an abnormal logic physical server, the abnormal logic physical server is dynamically switched to another idle logic physical server; and
    the logic management server is further used to update dynamic routing information of all logic physical servers in real time.

6. The game server architecture according to claim 5, wherein the game server architecture further comprises: an online player routing server used to monitor the game servers where each target user is located; and
    the online player routing server is respectively connected to the center server and the game servers, and when the target user is online, the center server controls the online player routing server to modify knapsack data; and when the target user is offline, the center server is switched to the logic server group to modify the knapsack data.

7. The game server architecture according to claim 5, wherein the game server architecture further comprises: a notification information push server; and
    the notification information push server is respectively connected to the game servers and the logic server, and is used to push a target message corresponding to the game servers and the logic server for the target user.

8. The game server architecture according to claim 1, wherein the logic server group is connected to the consistent-hash-based cache server and the database cluster, and the center server controls a public process to modify public data in the logic server group.

9. The game server architecture according to claim 1, wherein a data storage structure in the consistent-hash-based cache server is a key-value pair data structure.

10. The game server architecture according to claim 1, wherein the database cluster is specifically a MySQL database.

* * * * *